(12) United States Patent
Ureche et al.

(10) Patent No.: US 8,595,493 B2
(45) Date of Patent: Nov. 26, 2013

(54) MULTI-PHASE STORAGE VOLUME TRANSFORMATION

(75) Inventors: Octavian T. Ureche, Renton, WA (US); Alex M. Semenko, Issaquah, WA (US); Hui Huang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 12/759,406

(22) Filed: Apr. 13, 2010

(65) Prior Publication Data

US 2011/0252242 A1    Oct. 13, 2011

(51) Int. Cl.
*H04L 9/32* (2006.01)

(52) U.S. Cl.
USPC .............................. 713/168; 713/190; 713/193

(58) Field of Classification Search
USPC .................... 713/189, 190, 193; 711/163, 164
See application file for complete search history.

(56) References Cited

U.S. PATENT DOCUMENTS

| | | | | |
|---|---|---|---|---|
| 5,958,005 | A * | 9/1999 | Thorne et al. | 709/202 |
| 6,745,311 | B2 * | 6/2004 | Fabrizio et al. | 711/172 |
| 6,938,162 | B1 * | 8/2005 | Nagai et al. | 713/189 |
| 7,873,162 | B2 * | 1/2011 | Ohbi et al. | 380/201 |
| 7,983,417 | B2 * | 7/2011 | Buchen et al. | 380/241 |
| 8,108,693 | B2 * | 1/2012 | Atzmon et al. | 713/193 |
| 2003/0046570 | A1 * | 3/2003 | Ronkka et al. | 713/193 |
| 2005/0114686 | A1 | 5/2005 | Ball et al. | |
| 2006/0026338 | A1 * | 2/2006 | Ebara et al. | 711/103 |
| 2006/0062383 | A1 * | 3/2006 | Kaneda et al. | 380/28 |
| 2007/0038856 | A1 | 2/2007 | Ali et al. | |
| 2008/0189560 | A1 * | 8/2008 | Case et al. | 713/193 |
| 2008/0229118 | A1 * | 9/2008 | Kasako et al. | 713/193 |
| 2009/0089590 | A1 | 4/2009 | Challener et al. | |
| 2009/0276514 | A1 * | 11/2009 | Subramanian | 709/223 |
| 2010/0115223 | A1 * | 5/2010 | Sakaguchi | 711/170 |
| 2010/0250959 | A1 * | 9/2010 | Challener et al. | 713/189 |
| 2011/0022853 | A1 * | 1/2011 | Donie et al. | 713/190 |
| 2011/0153697 | A1 * | 6/2011 | Nickolov et al. | 707/827 |
| 2011/0185190 | A1 * | 7/2011 | Berengoltz et al. | 713/189 |
| 2011/0264924 | A1 * | 10/2011 | Koifman et al. | 713/189 |

OTHER PUBLICATIONS

Geiger, Matthew, and Lorrie Faith Cranor. "Scrubbing stubborn data: An evaluation of counter-forensic privacy tools." Security & Privacy, IEEE 4.5 (2006): 16-25.*

Hynes, Byron., "Keys to Protecting Data with BitLocker Drive Encryption", Retrieved at << http://technet.microsoft.com/en-us/magazine/2007.06.bitlocker.aspx>>, Jun. 2007, pp. 7.

(Continued)

*Primary Examiner* — Jeffrey Pwu
*Assistant Examiner* — Carlos Amorin
(74) *Attorney, Agent, or Firm* — Wolfe-SBMC (57) ABSTRACT

In accordance with one or more aspects, a storage volume is transformed into an encrypted storage volume or an unencrypted storage volume using a multi-phase process. One or more parts of the storage volume that have not yet been transformed are identified, and one or more parts of the storage volume that are allocated for use are identified. In a first phase of the multi-phase process, one or more parts of the storage volume that have not yet been transformed and that are allocated for use are transformed. In a second phase of the multi-phase process, after the first phase is finished, one or more parts of the storage volume that have not yet been transformed and are not allocated for use are transformed.

19 Claims, 5 Drawing Sheets

(56) References Cited

OTHER PUBLICATIONS

"Securing Windows Server 2008: BitLocker Authentication and Configuration", Retrieved at << http://searchstoragechannel.techtarget.com/generic/0,295582,sid98_gci1324342,00.html >>, Aug. 18, 2008, pp. 4.

"Secure Startup—Full Volume Encryption: Executive Overview", Retrieved at << http://download.microsoft.com/download/5/D/6/5D6EAF2B-7DDF-476B-93DC-7CF0072878E6/secure-start_tech.doc>>, Apr. 21, 2005, pp. 1-20.

"Full-disk Encryption", Retrieved at << http://sunoano.name/ws/public_xhtml/dm-crypt_luks.html >>, Dec. 26, 2009, pp. 62.

"TrueCrypt—Free Open-Source Disk Encryption Software", Retrieved at << http://www.truecrypt.org/docs/ >>, Retrieved Date: Jan. 29, 2010, pp. 2.

"DISK Protect—Full Disk Encryption Software", Retrieved at << http://www.becrypt.com/emea/Products/disk-protect>>, Retrieved Date: Jan. 29, 2010, pp. 4.

\* cited by examiner

MULTI-PHASE STORAGE VOLUME TRANSFORMATION

BACKGROUND

As computer storage technology has advanced, high-capacity portable storage devices have become increasingly commonplace. While these storage devices can store a large amount of information, their portable nature and frequently small size allows them to be easily lost or stolen. Accordingly, some of these portable storage devices are encrypted to protect the data stored on the devices. However, encrypting such portable storage devices is not without its problems. For example, it can take a significant amount of time to encrypt a portable storage device, which can lead to delays in users being able to use their portable storage devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a storage volume is transformed into an encrypted storage volume or an unencrypted storage volume by identifying one or more parts of the storage volume that have not yet been transformed and identifying one or more parts of the storage volume that are allocated for use. In a first phase, one or more parts of the storage volume that have not yet been transformed and that are allocated for use are transformed. In a second phase, after the first phase, one or more parts of the storage volume that have not yet been transformed and are not allocated for use are transformed.

BRIEF DESCRIPTION OF THE DRAWINGS

The same numbers are used throughout the drawings to reference like features.

DETAILED DESCRIPTION

Multi-phase storage volume transformation is discussed herein. A storage volume is transformed using a multi-phase transformation process. The transformation process can be encrypting of the storage volume or alternatively decrypting of the storage volume. The multi-phase transformation process uses a volume transformation record that indicates parts of the storage volume that have (and have not) been transformed, and a volume allocation record that indicates parts of the storage volume that are allocated for use (e.g., are storing programs or data). In a first phase of the transformation process, parts of the storage volume that have not yet been transformed and are allocated for use are transformed. After the first phase is finished, a second phase of the transformation process is performed in which parts of the storage volume that have not yet been transformed and are not allocated for use are wiped. This wiping of a part of the storage volume can include writing encrypted data to that part of the storage volume, or alternatively just recording in the volume transformation record that that part of the storage portion has been transformed.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key.

Figure 1:
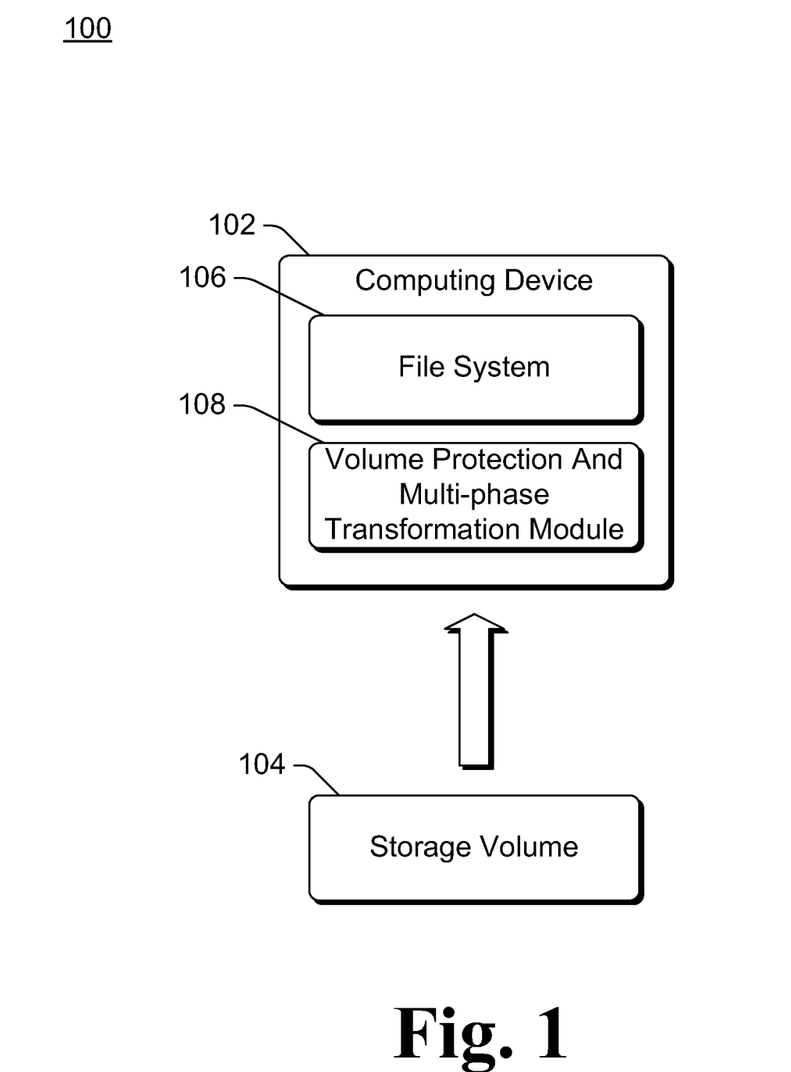
FIG. 1 illustrates an example system implementing the multi-phase storage volume transformation in accordance with one or more embodiments.

FIG. 1 illustrates an example system 100 implementing the multi-phase storage volume transformation in accordance with one or more embodiments. System 100 includes a computing device 102 that can be coupled to a storage volume 104. Computing device 102 can be a variety of different types of devices capable of communication with storage volume 104. For example, computing device 102 can be a desktop computer, a mobile station, a netbook or laptop computer, an entertainment appliance, a set-top box communicatively coupled to a display device, a television, a cellular or other wireless phone, a music or video playback device, a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

Storage volume 104 is a storage device that can be implemented using a variety of different technologies, such as a flash memory device, a magnetic disk, an optical disc, combinations thereof, and so forth. Storage volume 104 can also be a portion of a storage device that is treated by computing devices and operating systems logically as a storage device.

For example, a storage volume can be a partition of a hard drive, a portion of a flash memory device, and so forth.

Storage volume 104 can be coupled to computing device 102 in a variety of different wired and/or wireless manners. For example, storage volume 104 can be coupled to computing device 102 via a Universal Serial Bus (USB) connection, a wireless USB connection, an IEEE 1394 connection, a Bluetooth connection, and so forth. Storage volume 104 can be designed to be coupled to different computing devices (concurrently or at different times). In one or more embodiments, storage volume 104 is a removable volume, such as being part of a storage device designed to be easily coupled to and decoupled from computing device 102 and transported to other computing devices. An example of such a removable storage volume is a thumb drive or USB flash memory device. Alternatively, storage volume 104 can take other forms, such as being a network storage device that is coupled to computing device 102 via a network (e.g., the Internet, a local area network (LAN), a cellular or other phone network, an intranet, other public and/or proprietary networks, combinations thereof, and so forth).

To protect the data stored on storage volume 104, storage volume 104 can be encrypted using a volume-based or drive-based encryption technique. In a volume-based or drive-based encryption technique, entire volumes and/or drives are encrypted rather than individual files stored on those volumes and/or drives. In one or more embodiments, the encryption technique employed for encrypting and decrypting storage volume 104 is the BitLocker® drive encryption technique available from Microsoft Corporation of Redmond, Wash. Alternatively, other public and/or proprietary encryption techniques can be employed.

Computing device 102 includes a file system 106 and a volume protection and multi-phase transformation module 108. File system 106 is part of an operating system of computing device 102 that manages the storage and retrieval of files for computing device 102. This storage and retrieval includes storing files on and retrieving files from storage volume 104 as well as from other storage devices that are included as part of, or coupled to, computing device 102.

Volume protection and multi-phase transformation module 108 manages the encryption and decryption of data stored on storage volume 104. Volume protection and multi-phase transformation module 108 can also be referred to as a driver or filter driver that is situated in a storage stack between file system 106 and storage volume 104. Requests to read data from and write data to portions of storage volume 104 are passed to module 108, which in turn manages the retrieval and decryption of data from the requested portions of storage volume 104, as well as the encryption and storage of encrypted data on those portions of storage volume 104.

Data can be encrypted on storage volume 104 in a variety of different manners, including using symmetric key cryptography and/or public key cryptography. In one or more embodiments, storage volume 104 includes key protectors that store one or more keys that can be used to encrypt and/or decrypt data on storage volume 104. Volume protection and multi-phase transformation module 108 obtains such a key protector and retrieves the one or more keys contained within the key protectors if computing device 102 (and/or a user of computing device 102) is authorized to access storage volume 104. Alternatively, one or more keys that can be used to encrypt and/or decrypt data on storage volume 104 can be maintained in different manners, such as in a local store of computing device 102, on another computing device or storage volume, on a service accessible via a network (such as the Internet), and so forth.

Storage volume 104 can store encrypted data, in which case storage volume 104 is referred to as an encrypted storage volume. Storage volume 104 can alternatively store unencrypted data, in which case storage volume 104 is referred to as an unencrypted storage volume. Storage volume 104 can be transformed or converted from an unencrypted storage volume into an encrypted storage volume, or from an encrypted storage volume into an unencrypted storage volume. Thus, the transformation or conversion referred to herein can refer to encrypting a storage volume or decrypting a storage volume. It is to be appreciated that storage volume 104 can be transformed between an encrypted storage volume and an unencrypted storage volume multiple times.

Volume protection and multi-phase transformation module 108 also manages the transformation of storage volume 104 from an unencrypted storage volume into an encrypted storage volume and/or from an encrypted storage volume into an unencrypted storage volume. Generally, module 108 transforms storage volume 104 using a multi-phase transformation process. The multi-phase transformation process is based on which parts of the storage volume have been transformed and which parts have not been transformed, as well as which parts of the storage volume are allocated for use (e.g., are storing programs or data) and which parts are not allocated for use. In a first phase of the multi-phase transformation process, module 108 transforms parts of the storage volume that have not yet been transformed and are allocated for use. After the first phase is finished, module 108 performs a second phase of the transformation process in which parts of the storage volume that have not yet been transformed and are not allocated for use are wiped. The wiping of a part of the storage volume can include writing encrypted data to that part of the storage volume, or alternatively just recording in the volume transformation record that that part of the storage portion has been transformed. This multi-phase transformation process is discussed in more detail below.

Figure 2:
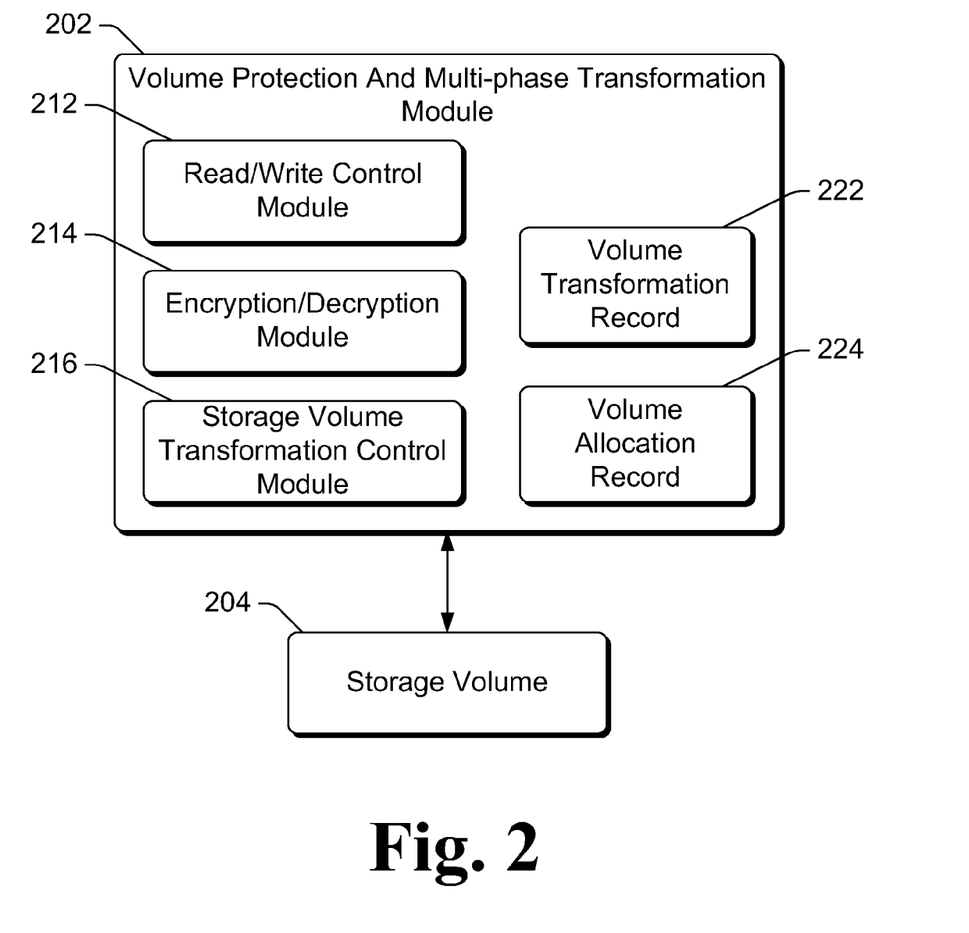
FIG. 2 illustrates an example volume protection and multi-phase transformation module in accordance with one or more embodiments.

FIG. 2 illustrates an example volume protection and multi-phase transformation module 202 in accordance with one or more embodiments. Volume protection and multi-phase transformation module 202 is, for example, a volume protection and multi-phase transformation module 108 of FIG. 1. Volume protection and multi-phase transformation module 202 manages the encryption and decryption of data stored on storage volume 204, which can be, for example, a storage volume 104 of FIG. 1.

Volume protection and multi-phase transformation module 202 includes a read/write control module 212, an encryption/decryption module 214, a storage volume transformation control module 216, a volume transformation record 222, and a volume allocation record 224. Read/write control module 212 receives read requests from a requester (e.g., from a file system) and retrieves the requested data from storage volume 204. Encryption/decryption module 214 decrypts the data retrieved from storage volume 204, and the decrypted data is returned by read/write control module 212 to the requester. Similarly, read/write control module 212 receives write requests from a requester (e.g., from a file system), and encryption/decryption module 214 encrypts the requested data (e.g., received with a write request). Read/write control module 212 writes the encrypted data to storage volume 204.

Data is stored in storage volume 204 in collections or groupings of bits, which can generally be referred to as portions of storage volume 204. These portions of storage volume 204 can be, for example, the size of conventional disk sectors or clusters. Data is typically read from and written to storage devices, including storage volume 204, in collections of bits equal in size to these portions of storage volume 204.

Read and write requests received by volume protection and multi-phase transformation module 202 from a file system or other requester identify particular portions of storage volume 204 that are to be read from or written to.

The file system with which volume protection and multi-phase transformation module 202 is used (e.g., file system 106 of FIG. 1) maintains a record of which portions of storage volume 204 are allocated for use and which portions of storage volume 204 are not allocated for use. Portions of storage volume 204 that are allocated for use are those portions that are associated with particular files and which store, for example, program instructions, program data, user data, and so forth. Portions of storage volume 204 that are not allocated for use are also referred to as free space on storage by 204. It is to be appreciated that over time the particular portions of storage volume 204 that are allocated for use can change. Changes to this record are made as portions are allocated or de-allocated for files by the file system.

This record maintained by the file system of which portions of storage volume 204 are and are not allocated for use can be maintained in a variety of different manners. In one or more embodiments, this record maintained by the file system is a bitmap with one bit corresponding to each portion of storage volume 204. The value of each bit in the bitmap indicates whether the corresponding portion of storage claim 204 is or is not allocated for use. Thus, this record is also typically referred to as a volume allocation bitmap (VAB). For example, each portion of storage volume 204 can be 64 kB (kilobyte) in size, and for any given 64 kB portion a corresponding bit in the bitmap is set (e.g., has a value of 1) if the portion is allocated for use and is cleared (e.g., has a value of 0) if the portion is not allocated for use. Alternatively, this record maintained by the file system can be a table, a list, or other data structure.

Storage volume transformation control module 216 manages the transformation of storage volume 204. This transformation can be transforming storage volume 204 from an unencrypted volume into an encrypted volume by encrypting storage volume 204. This transformation can also be transforming storage volume 204 from an encrypted volume into an unencrypted volume by decrypting storage volume 204. Storage volume transformation control module 216 transforms storage volume 204 using a multi-phase storage volume transformation technique as discussed in more detail below.

Storage volume transformation control module 216 can transform storage volume 204 in response to a variety of different events. In one more embodiments, module 216 transforms storage volume 204 in response to a user request that is received via a user interface (UI) of a device using volume protection and multi-phase transformation module 202. In other embodiments, module 216 transforms storage module 204 in response to other events, such as a request from another component or module of the device implementing volume protection and multi-phase transformation module 202, a request from another device, and so forth.

Figure 3:
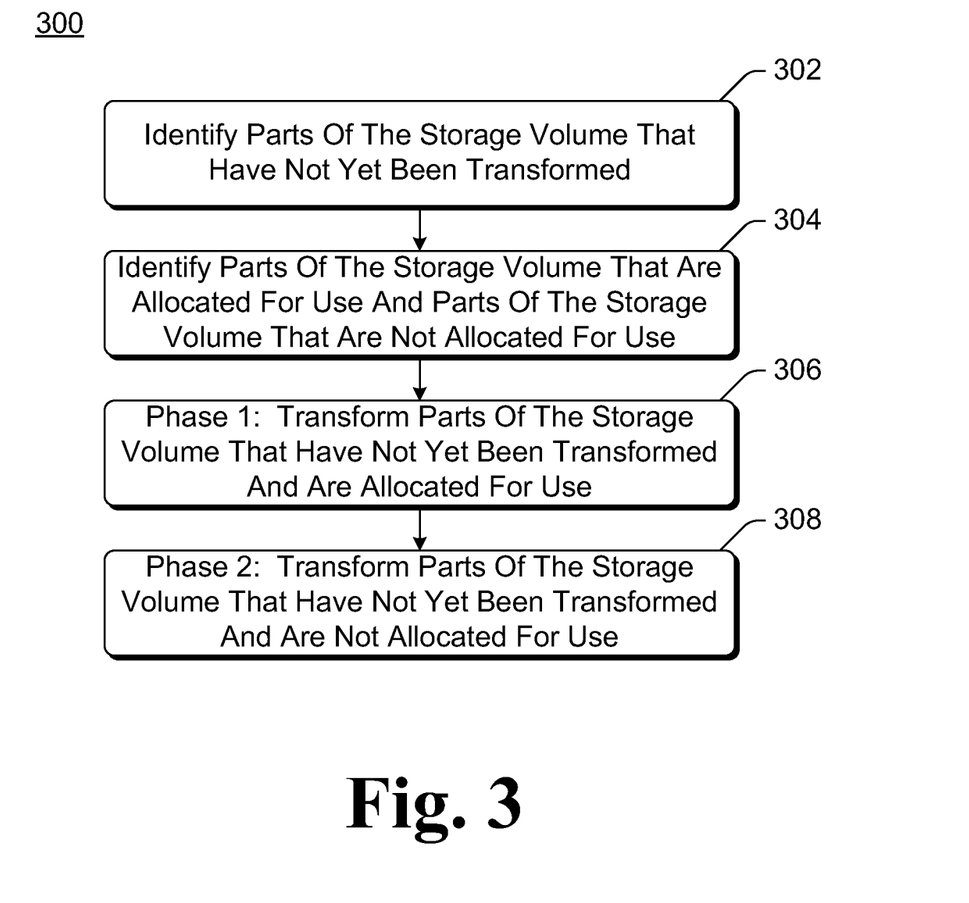
FIG. 3 is a flowchart illustrating an example process for performing multi-phase storage volume transformation in accordance with one or more embodiments.

FIG. 3 is a flowchart illustrating an example process 300 for performing multi-phase storage volume transformation in accordance with one or more embodiments. Process 300 is carried out by one or more modules of a device, such as volume protection and multi-phase transformation module 202 of FIG. 2 or volume protection and multi-phase transformation module 108 of FIG. 1. Process 300 can be implemented in software, firmware, hardware, or combinations thereof. Process 300 is shown as a set of acts and is not limited to the order shown for performing the operations of the various acts. Process 300 is an example process for performing a multi-phase storage volume transformation; additional discussions of performing a multi-phase storage volume transformation are included herein with reference to different figures.

In process 300, one or more parts of the storage volume that have not yet been transformed are identified (act 302). Additionally, one or more parts of the storage volume that are allocated for use and one or more parts of the storage volume that are not allocated for use are identified (act 304).

Parts of the storage volume that have not yet been transformed and are allocated for use are transformed (act 306). This transformation in act 306 is the first phase of the multi-phase storage volume transformation.

After parts of the storage volume that are allocated for use are transformed, parts of the storage volume that have not yet been transformed and are not allocated for use are transformed (act 308). Transforming parts of the storage volume that are not allocated for use is also referred to as wiping those parts of the storage volume. This transformation in act 308 is the second phase of the multi-phase storage volume transformation.

Thus, in process 300 those parts of the storage volume that are allocated for use are transformed prior to those parts of the storage volume that are not allocated for use.

Returning to FIG. 2, storage volume transformation control module 216 identifies which parts of storage volume 204 have been transformed (and which parts of storage volume 204 have not yet been transformed), as well as which parts of storage volume 204 are allocated (and which parts of storage volume 204 are not allocated). Storage volume transformation control module 216 uses volume transformation record 222 and volume allocation record 224 to assist with this identification. The parts of storage volume 204 can be referred to as portions or blocks of storage volume 224.

Volume allocation record 224 is a copy of the record of which portions of storage volume 204 are allocated for use and which portions of storage volume 204 are not allocated for use that is maintained by the file system. Storage volume transformation control module 216 can obtain this copy at different times, such as when storage volume 204 is coupled to the computing device including volume protection and multi-phase transformation module 202, when storage volume transformation control module 216 begins the transformation of storage volume 204, and so forth.

Volume transformation record 222 is a record that is generated and maintained by storage volume transformation control module 216. Storage volume 204 is treated as including multiple blocks, and volume transformation record 222 indicates at any given time which blocks of storage volume 204 have been transformed and which blocks of storage volume 204 have not yet been transformed.

The blocks of volume transformation record 222 correspond to the portions of volume allocation record 224. This correspondence can be a one-to-one correspondence, or alternatively a one-to-many correspondence or many-to-one correspondence. For example, a block of volume transformation record 222 can correspond to 10 portions of volume allocation record 224. This correspondence between blocks of volume transformation record 222 and portions of volume allocation record 224 can be identified in different matters, such as storing an indication of the correspondence (e.g., in record 222, record 224, or elsewhere), identifying the correspondence inherently in the data structures used to store records 222 and 224 (e.g., the first 10 portions in record 224 correspond to the first block of record 222, the second 10 portions in record 224 correspond to the second block of record 222, etc.), and so forth.

During the transformation process, storage volume transformation control module 216 uses volume transformation record 222 and volume allocation record 224 to identify parts (on a per-block basis) of storage volume 204 that have not yet been transformed and are allocated. Module 216 can use records 222 and 224 to identify blocks that have not yet been transformed and are allocated in a variety of different manners. For example, in the first phase module 216 can select portions from volume allocation record 224. For each selected portion from volume allocation record 224 that is allocated, module 216 obtains from volume transformation record 222 an indication of whether the corresponding block has been transformed. If the corresponding block has not been transformed, then module 216 transforms the block; however, if the corresponding block has been transformed, then module 216 selects another portion from volume allocation record 224. A similar process is performed for the second phase, except that module 216 selects portions from volume allocation record 224 that are not allocated.

By way of another example, module 216 can select blocks from volume transformation record 222. For each selected block from volume transformation record 222 that has not yet been transformed, module 216 obtains from volume allocation record 224 an indication of whether one or more of the portions corresponding to the selected block are allocated. In the first phase, if one or more of the portions corresponding to the selected block are allocated, then module 216 transforms the block; however, if none of the corresponding portions are allocated, then module 216 selects another portion from volume transformation record 222. In the second phase, if the corresponding portions are not allocated, then module 216 transforms the blocks; however, if the corresponding portions are allocated, then module 216 selects another portion from volume transformation record 222. Alternatively, in the second phase module 216 can just refer to volume transformation record 222 and transform each block that has not yet been transformed. Module 216 can assume that none of the corresponding portions of each block that has not yet been transformed is allocated (if a corresponding portion of a block were allocated, that block would have been transformed in the first phase).

In situations where storage volume 204 is being transformed into an encrypted storage volume, module 216 transforms a block of storage volume 204 by identifying the portions of storage volume 204 that correspond to the block. Module 216 communicates with read/write control module 212 to read these portions corresponding to the block from storage volume 204. Module 216 communicates with encryption/decryption module 214 to encrypt these portions, and communicates with read/write control module 212 to write these encrypted portions back to storage volume 204. Module 216 then updates volume transformation record 222 to reflect that the block has been transformed.

In situations where storage volume 204 is being transformed into an unencrypted storage volume, module 216 transforms a block of storage volume 204 by identifying the portions of storage volume 204 that correspond to the block. Module 216 communicates with read/write control module 212 to read these portions corresponding to the block from storage volume 204. Module 216 communicates with encryption/decryption module 214 to decrypt these portions, and communicates with read/write control module 212 to write these decrypted portions back to storage volume 204. Module 216 then updates volume transformation record 222 to reflect that the block has been transformed.

It should be noted that storage volume 204 can be accessed in a normal manner during the transformation process. Read and write requests can be received from a file system, and responded to by volume protection and multi-phase transformation module 202, while storage volume 204 is being transformed. In situations where storage volume 204 is being transformed into an unencrypted storage volume and a read request is received, the requested data is read from storage volume 204, decrypted if needed, and returned to the file system. Volume protection and multi-phase transformation module 202 can readily determine if the requested data is to be decrypted based on whether the block that includes the data has been transformed (as indicated in volume transformation record 222). If the block or blocks including the requested data have not yet been transformed, storage volume transformation control module 216 and read/write control module 212 can optionally write the decrypted blocks to storage volume 204 and update volume transformation record 222 to indicate the block or blocks have been transformed. In situations where storage volume 204 is being transformed into an unencrypted storage volume and a write request is received, the requested data is written to storage volume 204. If the block or blocks including the data being written have not yet been transformed, the received data is written to storage volume 204 in unencrypted form and the module 216 updates volume transformation record 222 to indicate that the block or blocks have been transformed.

In situations where storage volume 204 is being transformed into an encrypted storage volume and a read request is received, the requested data is read from storage volume 204, decrypted if needed, and returned to the file system. Volume protection and multi-phase transformation module 202 can readily determine if the requested data is to be decrypted based on whether the block that includes the data has been transformed (as indicated in volume transformation record 222). In situations where storage volume 204 is being transformed into an encrypted storage volume and a write request is received, the requested data is encrypted and written to storage volume 204. If the block or blocks including the data being written have not yet been transformed, then module 216 updates volume transformation record 222 to indicate that the block or blocks have been transformed.

Thus, in the multi-phase storage volume transformation process, blocks of storage volume 204 that correspond to at least one portion of storage volume 204 that is allocated are transformed in the first phase. After the first phase is finished, blocks of storage volume 204 that have not yet been transformed (which will be blocks that correspond to no portions that are allocated) are transformed. After the multi-phase storage volume transformation process is finished, volume transformation record 222 and volume allocation record 224 need not be maintained and can be deleted. However, it is to be appreciated that volume allocation record 224 is a copy of the record maintained by the file system, and the file system typically does not delete its copy of the record.

During the first phase, blocks of storage volume 204 to be transformed can be selected in a variety of different manners. For example, blocks can be selected randomly, can be selected in order from a beginning of record 222 to an ending of record 222, can be selected as blocks corresponding to portions selected in order from a beginning of record 224 to an ending of record 224, or according to some other rules or criteria.

In one more embodiments, the selection of blocks in the first phase can be prioritized based on different criteria, such as file type (e.g., as indicated by file extensions or other file metadata), storage location (e.g., which folders or directories files are stored in), and so forth. Blocks corresponding to portions that store files of a particular type or in a particular storage location can be transformed prior to other blocks that do not correspond to portions that store files of the particular type or in the particular storage location. In such embodiments, storage volume transformation control module 216 can query the file system to obtain information indicating which portions of storage volume 204 include files of a particular file type and/or files in a particular storage location.

During the second phase, blocks of storage volume 204 to be transformed can also be selected in a variety of different manners. The manner used to select blocks to be transformed in the second phase can be the same, or alternatively different, than the manner used to select blocks to be transformed in the first phase. For example, blocks can be selected randomly, can be selected in order from a beginning of record 222 to an ending of record 222, can be selected as blocks corresponding to portions selected in order from a beginning of record 224 to an ending of record 224, or according to some other rules or criteria.

In one more embodiments, the selection of blocks in the second phase can be prioritized based on different criteria, such as whether portions that are not allocated are associated with previously deleted files. Blocks corresponding to portions that are associated with previously deleted files can be transformed prior to other blocks corresponding to portions that are not associated with previously deleted files. The file system can maintain a record of portions that were previously, but are no longer, allocated to a file. Such situations can arise, for example, due to deletion of a file, due to deletion of temporary information associated with a file, and so forth. In such embodiments, storage volume transformation control module 216 can query the file system to obtain information indicating which portions of storage volume 204 are associated with previously deleted files.

After the first phase of the multi-phase storage volume transformation process is finished for storage volume 204, an indication of the first phase being finished can optionally be presented to a user. This indication can be presented, for example, via a user interface of a device to which storage volume 204 is coupled. This indication informs the user that the information (e.g., programs, data, and so forth) that the user has stored on storage volume 204 is protected, even though some parts of storage volume 204 (the free space) may not yet be protected.

In the second phase of the multi-phase storage volume transformation process, because the blocks of storage volume 204 being transformed are free space, the transforming of these blocks is also referred to as wiping the blocks. In one or more embodiments, in the second phase a secure wiping technique is used. Using the secure wiping technique, data is obtained, encrypted, and written to the storage volume in the portions corresponding to the blocks. The data can be obtained in different manners, such as generated randomly, accessing preconfigured data, obtaining data according to some other rules or process, and so forth. This obtaining, encrypting, and writing can optionally be repeated one or more times for each block (e.g., writing different encrypted data to the portions corresponding to the blocks each time).

In other embodiments, in the second phase a quick wiping technique is used. In the quick wiping technique, the volume transformation record 222 is updated to reflect that the blocks have been transformed. In the quick wiping technique, no data need be read from or written to storage volume 204, and no data need be encrypted or decrypted. Using the quick wiping technique, volume transformation record 222 can be updated to reflect that each block that has not already been encrypted (in the first phase) has been transformed.

It should be noted that using the multi-phase storage volume transformation techniques discussed herein, the process of transforming storage volume 204 can be paused or interrupted, and subsequently resumed. The transformation process can be paused or interrupted in response to a variety of events, such as a user request, a power failure, storage volume 204 being decoupled from the device that includes volume protection and multi-phase transformation module 202, and so forth. If the transformation process is paused or interrupted, volume transformation record 222 is preserved. Volume transformation record 222 can be preserved in different manners, such as copying record 222 to storage volume 204, copying record 222 to another device or service, maintaining record 222 in nonvolatile memory during normal operation of volume protection and multi-phase transformation module 202, and so forth.

The transformation process can be subsequently resumed in response to a variety of events, such as a user request, power being restored, storage volume 204 being coupled to a device that includes volume protection and multi-phase transformation module 202, and so forth. Storage volume transformation control module 216 obtains the preserved copy of volume transformation record 222 and continues with the transformation process.

It should be noted that volume allocation record 224 need not be preserved. Rather, a copy of the record maintained by the file system can be obtained to be used as volume allocation record 224 when the transformation process resumes.

Additionally, it should be noted that in one or more embodiments the encryption and decryption performed by encryption/decryption module 214 does not alter the size of data stored on storage volume 204. For example, during the transformation process if data read from storage volume 204 is 8263 kB, the encrypted data is also 8263 kB. Accordingly, the data read from storage volume 204 can be written to the same portions after transforming the data. In other embodiments, the encryption and decryption performed by encryption/decryption module 214 can alter the size of data stored on storage volume 204. In such embodiments, the data read from storage volume 204 can be stored in more portions, or fewer portions, after transforming the data. Storage volume transformation control module 216 communicates with the file system to have one or more portions allocated, or de-allocated, as appropriate based on the changed size.

Figure 4:
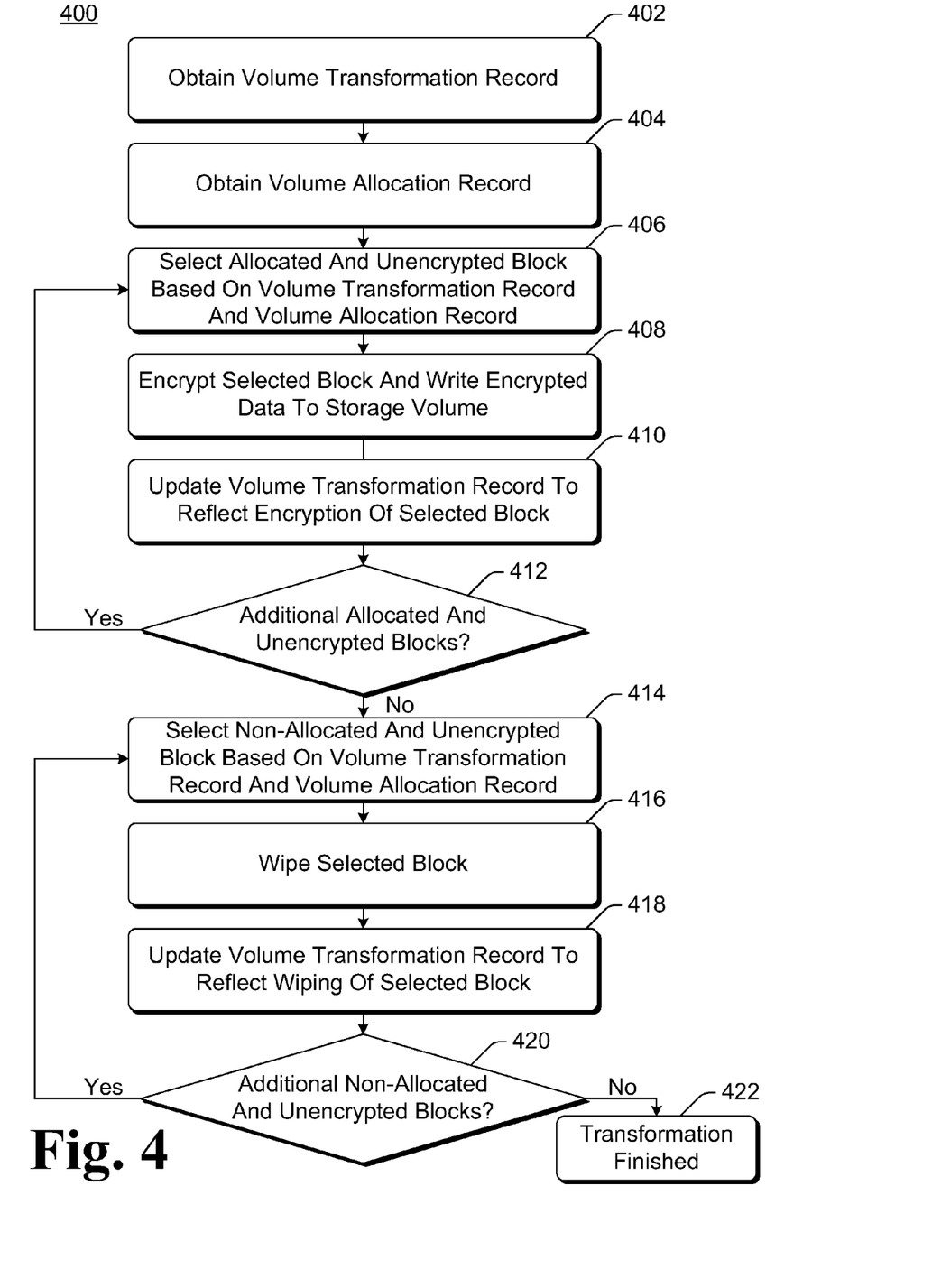
FIG. 4 is a flowchart illustrating an example process for using multi-phase storage volume transformation to transform a storage volume into an encrypted storage volume in accordance with one or more embodiments.

FIG. 4 is a flowchart illustrating an example process 400 for using multi-phase storage volume transformation to transform a storage volume into an encrypted storage volume in accordance with one or more embodiments. Process 400 is carried out by one or more modules of a device, such as volume protection and multi-phase transformation module 202 of FIG. 2 or volume protection and multi-phase transformation module 108 of FIG. 1. Process 400 can be implemented in software, firmware, hardware, or combinations thereof. Process 400 is shown as a set of acts and is not limited to the order shown for performing the operations of the various acts. Process 400 is an example process for using multi-phase storage volume transformation to transform a storage volume into an encrypted storage volume; additional discussions of using multi-phase storage volume transformation to transform a storage volume into an encrypted storage volume are included herein with reference to different figures.

In process 400, a volume transformation record is obtained (act 402). The volume transformation record indicates which blocks in the storage device have and have not been transformed (encrypted in the example of FIG. 4). The volume transformation record can be obtained in different manners, such as generating a new volume transformation record (indicating that no blocks have been transformed yet), obtaining a preserved copy of a volume transformation record, and so forth.

A volume allocation record is also obtained (act 404). The volume allocation record can be obtained by copying a record maintained by the file system as discussed above.

An allocated and unencrypted block is selected based on the volume transformation record and the volume allocation record (act 406). An allocated and unencrypted block is a block that has not yet been transformed and that corresponds to at least one portion of the storage volume that is allocated. The block can be selected in a variety of different manners as discussed above.

The selected block is encrypted and the encrypted data is written back to the storage volume (act 408). The volume transformation record is also updated to reflect that the selected block has been encrypted (act 410). This updating reflects that the selected block has been transformed as discussed above.

Process 400 then proceeds based on whether there are additional allocated and unencrypted blocks in the storage device (act 412). If there are one or more additional allocated and unencrypted blocks in the storage device, then process 400 returns to act 406 to select another block.

However, if there are no more allocated and unencrypted blocks in the storage device, then the first phase of the multi-phase storage volume transformation is finished. Accordingly, a non-allocated and unencrypted block is selected based on the volume transformation record and the volume allocation record (act 414). A non-allocated and unencrypted block is a block that has not yet been transformed and that corresponds to no portions of the storage volume that are allocated. The block can be selected in a variety of different manners as discussed above.

The selected block in the storage device is wiped (act 416). A secure wiping technique or a quick wiping technique can be used as discussed above.

The volume transformation record is also updated to reflect that the selected block has been encrypted (act 418). This updating reflects that the selected block has been transformed as discussed above.

Process 400 then proceeds based on whether there are additional non-allocated and unencrypted blocks in the storage device (act 420). If there are one or more additional non-allocated and unencrypted blocks in the storage device, then process 400 returns to act 414 to select another block.

However, if there are no more non-allocated and unencrypted blocks in the storage device, then the second phase of the multi-phase storage volume transformation is finished. Accordingly, the transformation process is finished (act 422).

As discussed above, read and write requests can be received from a file system, and responded to by the volume protection and multi-phase transformation module, while the storage volume is being transformed. Thus, read and write requests can be received and responded to during process 400. This can result in changes to the volume transformation record being made in response to a request (e.g., a write request) while process 400 is being performed.

Process 400 illustrates an example of using multi-phase storage volume transformation to transform a storage volume from an unencrypted storage volume into an encrypted storage volume. It is to be appreciated that an analogous process can be used to transform a storage volume from an encrypted storage volume into an unencrypted storage volume, although decryption is used rather than encryption, and encrypted rather than unencrypted blocks are selected in acts 406 and 414.

Figure 5:
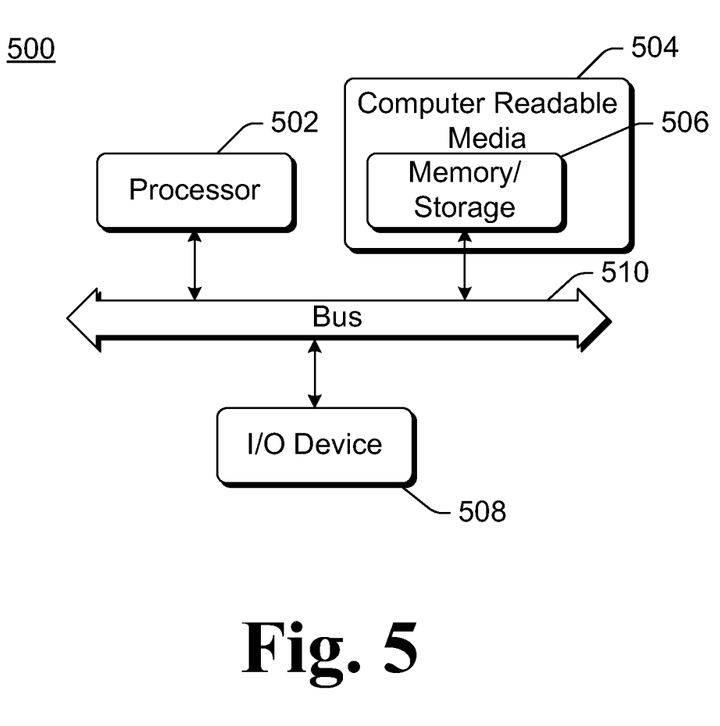
FIG. 5 illustrates an example computing device that can be configured to implement the multi-phase storage volume transformation in accordance with one or more embodiments.

FIG. 5 illustrates an example computing device 500 that can be configured to implement the multi-phase storage volume transformation in accordance with one or more embodiments. Computing device 500 can be, for example, computing device 102 of FIG. 1, or can implement volume protection and multi-phase transformation module 202 of FIG. 2.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the multi-phase storage volume transformation techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, in computing device, for transforming a storage volume into an encrypted storage volume or an unencrypted storage volume, the method comprising:
   identifying one or more parts of the storage volume that have not yet been transformed;
   identifying one or more parts of the storage volume that are allocated for use;
   transforming a first one or more parts of the storage volume that have not yet been transformed and that are allocated for use wherein transforming comprises one of encrypting or decrypting the first one or more parts of the storage volume; and
   transforming, after transforming the first one or more parts of the storage volume, a second one or more parts of the storage volume that have not yet been transformed and are not allocated for use, the transforming comprising wiping the second one or more parts by writing encrypted data to the second one or more parts a plurality of times.

2. The method as recited in claim 1, the method comprising a method for transforming the storage volume into the encrypted storage volume, wherein the transforming the first one or more parts of the storage volume comprises encrypting the first one or more parts.

3. The method as recited in claim 2, further comprising:
   receiving, before finishing transforming the storage volume, a request to write data to one or more portions of the storage volume that correspond to a part of the storage volume that has not yet been transformed;
   encrypting the data;
   writing the encrypted data to the one or more portions of the storage volume; and
   updating a volume transformation record to indicate that the part of the storage volume has been transformed.

4. The method as recited in claim 1, the method comprising a method for transforming the storage volume into the unencrypted storage volume, wherein the transforming the first one or more parts of the storage volume comprises decrypting the first one or more parts of the storage volume.

5. The method as recited in claim 1, further comprising:
   maintaining a volume transformation record that indicates a first one or more blocks of the storage volume that have been transformed and a second one or more blocks of the storage volume that have not been transformed, wherein the transforming the first one or more parts and the transforming the second one or more parts comprises transforming the first one or more parts and the second one or more parts on a block by block basis, and wherein the identifying one or more parts of the storage volume that have not yet been transformed comprises identifying, based on the volume transformation record, one or more blocks of the storage volume that have not yet been transformed; and
   updating, after transforming a block of the storage volume, the volume transformation record to indicate that the block of the storage volume has been transformed.

6. The method as recited in claim 5, wherein the transforming the second one or more parts of the storage volume comprises updating the volume transformation record, without encrypting or decrypting data in the second one or more parts of the storage volume, to indicate that blocks of the storage volume that are the second one or more parts of the storage volume have been transformed.

7. The method as recited in claim 5, wherein the transforming the second one or more parts of the storage volume further comprises selecting portions of the storage volume in a prioritized order in which portions of the storage volume that were previously used to store data for files that were subsequently deleted are transformed before other portions of the storage volume.

8. The method as recited in claim 1, wherein the identifying one or more parts of the storage volume that are allocated for use comprises obtaining a volume allocation bitmap from a file system of the computing device, and identifying the one or more parts based on the volume allocation bitmap.

9. The method as recited in claim 1, wherein each of the one or more parts of the storage volume comprises a cluster.

10. The method as recited claim 1, wherein the transforming the first one or more parts of the storage volume comprises selecting portions of the storage volume in a prioritized order in which portions of the storage volume that store a particular type of file are transformed before portions of the storage volume that store other types of files.

11. The method as recited claim 1, wherein the transforming the first one or more parts of the storage volume comprises selecting portions of the storage volume in a prioritized order in which portions of the storage volume that store files in a particular location are transformed before portions of the storage volume that store files in other locations.

12. One or more computer-readable storage device having stored thereon multiple instructions that, when executed by one or more processors of a computing device, cause the one or more processors to:

obtain a volume transformation record indicating which of multiple blocks of a storage volume have not been encrypted, each of the multiple blocks corresponding to one or more portions of the storage volume;

identify portions of the storage volume that are allocated for use;

for each of the multiple blocks corresponding to at least one portion of the storage volume that is allocated for use, encrypt the block and update the volume transformation record to indicate that the block has been encrypted; and after the blocks corresponding to at least one portion of the storage volume that are allocated for use have been encrypted, wipe each block that is indicated in the volume transformation record as not having been encrypted, the wiping comprising writing encrypted data to the blocks a plurality of times.

13. The one or more computer-readable storage device as recited in claim 12, wherein the multiple instructions further cause the one or more processors to:

receive, before transformation of the storage volume is finished, a request to write data to a particular one or more portions of the storage volume that correspond to a block of the storage volume that has not yet been encrypted;

encrypt the data;

write the encrypted data to the particular one or more portions of the storage volume; and update the volume transformation record to indicate that the block of the storage volume that corresponds to the particular one or more portions has been transformed.

14. The one or more computer-readable storage device as recited in claim 12, wherein to wipe a block includes to:

update the volume transformation record to indicate that the block has been encrypted.

15. The one or more computer-readable storage device as recited in claim 12, wherein to wipe each block is further to select blocks of the storage volume to be wiped in a prioritized order in which blocks that correspond to portions of the storage volume that were previously used to store data for files that have since been deleted are wiped before other portions of the storage volume.

16. The one or more computer-readable storage device as recited in claim 12, wherein to wipe each block is to update the volume transformation record to indicate that each of the multiple blocks that has not been encrypted has been encrypted.

17. The one or more computer-readable storage device as recited in claim 16, wherein to wipe each block is further to update the volume transformation record to indicate, without writing data to portions of the storage volume corresponding to each block that is indicated in the volume transformation record as not having been encrypted, that each of the multiple blocks that has not been encrypted has been encrypted.

18. The one or more computer-readable storage device as recited in claim 12, wherein to encrypt each of the multiple blocks corresponding to at least one portion of the storage volume that is allocated for use is to encrypt the multiple blocks in a prioritized order in which portions of the storage volume that store a particular type of file or store files in a particular location are transformed before portions of the storage volume that store other types of files or store files in other locations.

19. A method, in computing device, for transforming a storage volume into an encrypted storage volume, the method comprising:

obtaining a volume transformation record indicating which of multiple blocks of a storage volume have not been encrypted, each of the multiple blocks corresponding to one or more clusters of multiple clusters of the storage volume;

obtaining, from a file system of the computing device, a volume allocation record indicating which of the multiple clusters of the storage volume are allocated for use;

for each of the multiple blocks corresponding to at least one cluster of the storage volume that is allocated for use, encrypting the block and updating the volume transformation record to indicate that the block has been encrypted; and after the blocks corresponding to at least one cluster of the storage volume that are allocated for use have been encrypted, for each of the multiple blocks corresponding to no cluster of the storage volume that is allocated for use, wiping the block by writing encrypted data a plurality of times for the block to the one or more clusters of the storage volume corresponding to the block, and updating the volume transformation record to indicate that the block has been encrypted.

* * * * *